United States Patent Office 3,063,955
Patented Nov. 13, 1962

3,063,955
AQUEOUS POLYSPIRANE RESINOUS COMPOSITIONS CONTAINING HALF ESTERS OF POLYCARBOXYLIC ANHYDRIDE AND METHOD OF MAKING SAME
Robert E. Kass, Springfield, Albert H. Markhart, Wilbraham, and Edward Lavin, Longmeadow, Mass., assignors to Shawinigan Resins Corporation, Springfield, Mass., a corporation of Massachusetts
No Drawing. Filed Mar. 4, 1959, Ser. No. 797,016
5 Claims. (Cl. 260—29.3)

This invention relates to modified polyspirane resin compositions. The term "polyspirane" appearing in this specification and claims refers to a polyspiroacetal having a chemical structure defined in the co-pending application of R. E. Kass, C. F. Hunt, and A. H. Markhart, Serial Number 764,493, filed October 1, 1958, now Patent Number 3,015,643. More particularly this invention pertains to the modified coating compositions of aqueous dispersions of polyspirane resins and the cured resinous products made therefrom, which products are especially suitable for electrical conductor insulation.

It has been well known in the art to apply a resin coating to an electrical conductor for the purpose of electrically insulating such a conductor from its surroundings. Most of the compositions used are organic materials which are applied from solutions of the resin in an organic solvent wherein a film is applied from the coating composition, the solvent then removed from the film and finally the remaining resin heat cured to form a substantially solid continuous insulative coating. The utilization of aqueous resin dispersions for this application, such as taught in U.S.P. 2,787,561 and 2,787,603 is a known method to minimize or eliminate objectionable problems generally associated with the use of organic solvents. On the other hand, these dispersions create additional problems which have not heretofore been solved.

Films from known aqueous dispersions of electrically insulating, film-forming resinous materials do not have temperature stability at or above 130° C. for the extended periods of time required for such commercial applications as motors, generators, and the like. The coatings of the present invention do possess the combination of 1 kv.-heat life, cut-through, and heat shock properties definitive of such temperature stability.

The primary object of this invention is to provide a novel coating composition comprising an aqueous dispersion of a polyspirane resin and a curing agent therefor, comprising a water diffusible organic acid-ester material. The term "water diffusible" as used in the present invention is meant to define those acid-esters which are either water soluble or soluble in mixtures of water and an additional solvent. When a water soluble acid-ester is used as the curing agent for the polyspirane dispersion coating composition, it is obvious that the organic solvent problem is completely eliminated. But even when the curing agent used is one that is soluble only in a mixture of water and an organic solvent, the problem can be greatly minimized by selection of an appropriate organic solvent. For example, a mixture of diacetone alcohol and water is a suitable solvent for the curing agent. A water diffusible curing agent in the coating composition eliminates the heterogeneity inherent where the curing agent is contained in the liquid coating composition as a dispersion of solid discrete particles.

A further important object of this invention is to provide a cross-linked, cured film which is particularly suitable for electrical insulation both at high and low temperatures. A still further object of this invention is to provide a coating composition which can be heat cured to a smooth, tough, hard, flexible film which is abrasion resistant, temperature resistant, and solvent resistant. These and other objects will become readily apparent from the following examples and from subsequent discussions thereon.

The primary object of this invention can be accomplished by the polymerization of a mixture of the dialdehyde and polyhydric alcohol monomers of the polyspirane resin in water according to the suitable conditions of polymerization to form a dispersion, thereafter adding to the dispersion either a water soluble curing agent alone or, where the curing agent is not water soluble in combination with a water miscible solvent for the curing agent, to form a cross-linkable coating composition. Such a coating composition can be heat cured by conventional means to form a continuous film having the properties mentioned heretofore. A cured film from a composition of the aqueous polyspirane dispersion and the curing agent alone possesses the very desirable properties which makes it an excellent dielectric and it can be produced in continuous form without the aid of other polymeric materials. The addition of other compatible polymers can improve certain of the physical and chemical properties of the cured film, as will be shown in later examples. By "compatible" is meant those polymers which will remain stable in an acidic coating composition, as well as become part of the cured film under acidic conditions. The acidity of the coating compositions is critical for the successful practice of the invention.

The polyspirane dispersions used in the practice of the present invention and their general preparations are described in the copending application Serial Number 764,493, filed October 1, 1958. This dispersion consists of discrete individual polyspirane resin particles with a preferred average size range of 1–4 microns. The dispersion is thixotropic in that it will assume the consistency of a soft gel with time that can be brought back to its original fluid state by simple agitation.

The cured resin composition of the present invention is the reaction product of the polyspirane resin and the curing agent. The cure reaction consists primarily in a cross-linking mechanism whereby the normally thermoplastic polyspirane resin is converted to an infusible material having greatly improved chemical and mechanical stability.

The invention is practiced in its preferred embodiment as illustrated in the following examples but is not limited thereto. Whenever, in the specification and claims, reference is made to parts and percentages, the reference is to parts and percentages by weight unless otherwise stated.

EXAMPLE 1

(a) Preparation of the Poly(Glutardiylidene Pentaerythritol) Dispersion

Into a 2-gallon reaction vessel equipped with a 7" diameter stator ring and a 3½" diameter, four-bladed impeller capable of efficient high speed mixing is charged 900 grams of technical pentaerythritol, which is a mixture of 88 parts by weight of the mixture of monopentaerythritol and 12 parts by weight of dipentaerythritol, along with 2630 grams of a 25% by weight aqueous solution of glutaraldehyde stabilized to a pH of 2.6 with a mineral acid, 1.4 grams of oxalic acid and in addition 2250 grams of distilled water. The mixture is stirred at an impeller speed of 1600–1650 r.p.m. and the contents heated to 90° C. by which time the pentaerythritol is all dissolved. The reaction is preferably carried out in a temperature range of about 90–100° C. and for a period of about 8 to 12 hours.

The reaction product is a 21% total solids thioxotropic aqueous dispersion of discrete polyspirane resin particles of average size range of 1–4 micron diameter. If a sample of this dispersion is heated sufficiently so that the water in which the resin particles are suspended is driven off, the isolated resin remaining will melt in the range 200–220° C. The Ostwald viscosity of a 7½% by weight solution of this isolated resin in cresylic acid is 40–70 centipoises at 20° C. The molecular weight of the polymer as calculated from hydroxyl group measurements is 700–1200.

*(b) Preparation of the Wire Enamel*

To 800 grams of the dispersion prepared above is added a solution comprising 19.6 grams of the diethyl ester of pyromellitic acid in 200 ml. of ethanol with agitation and at room temperature. 1.0 gram of zinc acetate dihydrate is then dissolved in the mixture with continued agitation until the additive has all dissolved. The product is a wire enamel having a uniform consistency and good storage stability.

The wire enamel prepared above is applied to AWG 18 magnet wire by means of passing the wire vertically through container of the enamel while agitating the latter. The coated wire is next passed through a conventional type wire enamel tower operated at 300–400° C. where the coating is dried and heat-cured to form a cross-linked film having the properties shown in Table 1.

EXAMPLE 2

The same procedure is followed as described in Example 1 for both the preparation of the resin dispersion and the wire enamel, except that 13.1 grams of the diethyl ester of pyromellitic acid is substituted for the amount used in that example. The properties of the cured film are shown in Table 1.

EXAMPLE 3

The same procedure is followed as described in Example 1 for both the preparation of the resin dispersion and the wire enamel, except that a solution of 17.8 grams of the dimethyl ester of pyromellitic acid in 275 cc. methyl alcohol and 2.0 grams zinc acetate dihydrate is used.

EXAMPLE 4

The same procedure is followed as described in Example 1 for both the preparation of the resin dispersion and the wire enamel, except that in the latter preparation, 4.8 grams of pyromellitic acid is substituted for the ethanol solution of the diethyl ester of pyromellitic acid used in that example. 1.0 gram of zinc borate is substituted for the zinc acetate dihydrate used in that example and also 2.0 grams of hydroxyethyl cellulose thickener is added.

AWG 18 magnet wire is coated with the above wire enamel and cured as described in Example 1, except that dies are used after the dipping operation to remove excess dispersion from the coated wire. The properties of the cured film are shown in Table 1.

EXAMPLE 5

It is not intended to limit the present invention to only those polyspirane polymers shown in the preceding examples. It is possible to enhance the beneficial properties of the cured, cross-linked resin product, for example, if the polyspirane portion of the reaction product is obtained by reacting the dialdehyde selected with a mixture of polyhydric alcohol monomers containing a greater ratio of dipentaerythritol to monopentaterythritol than shown previously.

Accordingly into a 2-gallon reaction vessel equipped with a 7″ diameter stator ring and a 3½″ diameter, four-bladed impeller capable of efficient high speed mixing is charged 2572 grams of a 24% by weight aqueous solution of glutaraldehyde stabilized to a pH of 2.8 with a mineral acid, along with 1000 grams of a mixture of pentaerythritol containing 76 parts by weight of the mixture of monopentaterythritol and 24 parts by weight of the mixture of dipentaerythritol, 0.30 grams of oxalic acid and in addition 2400 cc. of water. The mixture is stirred at an impeller speed of 1200–1300 r.p.m. and the reaction is preferably carried out in a temperature range of about 60–100° C. for a period of about 12–24 hours.

The reaction product consists of a thixotropic dispersion containing approximately 23% by weight of discrete resin particles. The dispersion resin particles, when isolated, melt at temperatures in the range 200–220° C. The resin contains approximately 20% more hydroxyl groups than the same molecular weight product made according to Example 1.

The dispersion is homogenized by passing it through a Morehouse mill set at one mil clearance. To 800 grams of the homogenized dispersion is added a solution comprising 26.1 grams of the diethyl ester of pyromellitic acid in 200 grams of acetone with agitation and at room temperature. 2.0 grams of zinc acetate are then dissolved in the dispersion.

The above wire enamel is applied to magnet wire and heat-cured according to the method described in Example 1. The 1 kv. heat-life values for samples thus prepared are 91 hours at 240° C. and 638 hours at 200° C. An extrapolation of these values exceeds a rating of 20,000 hours at 130° C. Other properties of the cured film are shown in Table 1.

TABLE 1

| Property | Example 1 | Example 2 | Example 3 | Example 4 | Example 5 | Example 7 |
| --- | --- | --- | --- | --- | --- | --- |
| Approximate Total Solids of the Dispersion (wt. percent) | 21.0 | 21.0 | 19.0 | 23.5 | 23.4 | 23.6 |
| Film Thickness (mils) | 3.4 | 3.2 | 3.0 | 3.1 | 3.1 | 3.0 |
| Jerk Test | Passed | Passed | Passed | Passed | Passed | Passed |
| Abrasion Resistance (Strokes Average) | 29 | 30 | 18 | 10 | 53 | 60 |
| Cut-Thru Temperature (° C.) | 200 | 190 | 230 | 190 | 270 | 295 |
| Dielectric Strength (Volts/mil) | 2,800 | 2,969 | 2,408 | 2,050 | 2,180 | 2,300 |
| Solvent Resistance | Passed | Passed | Passed | Passed | Passed | Passed |
| Wrap Test | 1 | 1 | 1 | 1 | 1 | 1 |

The jerk test is a measure of the adherence and flexibility of the cured film to the metal wire and is made in accordance with A.S.A. (American Standards Association) specifications, whereby a sample of the cured, coated wire is elongated to failure of the wire at a jerk rate of 12–16 feet per second. The sample passes the test if no cracks or loss of adherence appears in the coating more than ⅛″ from the break after the test. The A.S.A. abrasion resistance test is performed by scraping the wire coating (under a 700 gram load) on a standard machine tester until contact is made with the metal wire substrate.

The cut-through temperature is a test for thermoplastic flow of the coating, whereby crossed, coated wires are mechanically loaded while the ambient temperature is raised until electrical contact is made between the metallic substrates of the wire.

The dielectric strength of the coating was measured by an A.S.A. procedure whereby the voltage at which the breakdown between the coatings on a pair of twisted coated wires occurred is reported on a per unit thickness of the coating basis.

The solvent resistance test is a modified A.S.A. procedure which subjects a coated wire to mechanical stress to measure the removability of the coating after a 10- minute immersion in an equivolume boiling solution of ethanol and toluene.

The wrap test is a measure of the flexibility of the coating made by a modified A.S.A. procedure whereby the coated wire is wrapped around circular mandrels of the same diameter as the wire or multiple diameters thereof. The smallest diameter mandrel about which the coated wire can be wrapped for 10 turns without visible cracks or ruptures is reported. For example, a report of 1 signifies that the sample will pass on a mandrel of the same diameter as the wire being tested, while a report of 2 signifies that the coating may not be wrapped around a mandrel smaller than twice the diameter of the wire without failure within 10 turns.

It is evident from the results shown in Table 1 that such modified composition polyspirane coatings made excellent dielectric barriers for electrical conductors used both at low and at high temperatures. As further evidence of the high temperature usefulness of the compositions disclosed in the present invention for electrical insulation, the particular compositions of Example 1 had 1 kv. heat-life when rated at 160° C. for over 5000 hours. The 1 kv. life is a measure of the thermal stability of the coating made according to modified A.I.E.E. No. 57 (February 1958) test procedure whereby a twisted pair of coated wires is subjected to 1,000 volts for 1 second after periods of aging at elevated temperatures until dielectric failure of the sample occurs. It is also evident from Table 1 that by comparison the cured product from the Example 5 composition containing more hydroxyl groups than the like product of Example 1 was a more stable coating as illustrated both by greater abrasion resistance and a higher cut-through temperature.

It is further possible to increase the utility of the polyspirane coatings shown herein by the addition of other polymeric materials to the dispersions and subsequently heat-curing the composition with the aid of the curing agent. The addition of other polymeric materials to the aqueous dispersions of Example 1 is illustrated in Example 6 together with the effect of such additive on the abrasion resistance of the cured coating.

EXAMPLE 6

A wire enamel was prepared having the following composition:

| Dispersion (grams) | Total Solids of Dispersion (wt. percent) | Additives | Abrasion Resistance (Ave. Strokes) |
|---|---|---|---|
| 840 | 21.0 | 19.6 grams of the methyl diester of pyromellitic acid (dissolved in 157 grams ethanol). 2.0 grams zinc acetate dihydrate (dissolved in 10 cc. water). 28.0 grams meta-para-cresol-formaldehyde resin (added as a 66% by weight aqueous solution). | 211 |

The result of Example 6 illustrates that the additive used provides greater abrasion resistance in the cured films than is obtained for any of the compositions of the preceding examples.

The class of curing agents which is preferred in the practice of the present invention comprises the acid-esters or half esters, as they are sometimes referred to, of aromatic polycarboxylic acids.

In addition to the diethyl ester of pyromellitic acid used in the preceding examples, the dimethyl ester of pyromellitic acid is a suitable curing agent. But other useful curing agents can be selected from the broad class of half esters of organic acid and acid anhydride materials and their isomers generally, including the saturated and unsaturated aliphatic series and the alicyclic series as well as the aromatic series, and of which, the acid esters of methyl succinic acid, maleic acid, hexachloro-endomethylene tetrahydrophthalic acid and pyromellitic acid respectively are typical.

The suitable class of curing agents can be generally characterized as those which are either water soluble or soluble in miscible mixtures of water and inert organic liquids. The general class may be more specifically characterized as the acid-ester product of the reaction between an alcohol and a polycarboxylic acid anhydride selected from the group consisting of anhydrides and dianhydrides. It is believed that such acid-esters will decompose and form the acid anhydride from which the acid-ester was derived, during the heat-cure cycle for the polyspirane composition, resulting in a substantially cross-linked resinous film having the properties heretofore mentioned. The use of water soluble acid esters has certain advantages not possessed by the non-water soluble type for the wire enamel applications utilizing polyspirane dispersions. For example, the water soluble type of acid-ester curing agent permits the elimination of any organic solvent in the enamel thereby removing any problems of toxicity and inflammability attendant to such use.

The water soluble class of acid-esters can be selected from those prepared by reacting glycol type materials with the appropriate acid anhydride according to the following type reaction:

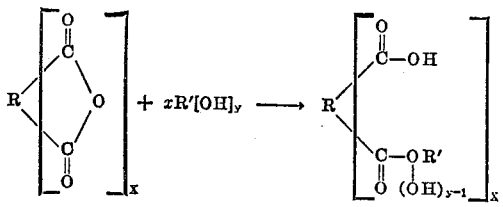

where R is an organic radical selected from the group consisting of the aliphatic series, alicyclic series, and aromatic series, R is an organic radical selected from the aliphatic series and having 2-8 carbon atoms, $x$ is an integer from 1-2 and $y$ is an integer from 2-3. Typical acid anhydride materials include pyromellitic anhydride, methyl succinic anhydride, maleic anhydride, and hexachloroendomethylene tetrahydrophthalic anhydride. Typical polyol materials include both diols as well as triols, for example, ethylene glycol, butylene glycol, dimethyl hexane diol and glycerol. It is preferred to react a molar excess of the glycol material with the anhydride during the preparation of the diester to assure complete reaction and to reduce the tendency for polymer formation. The reaction is conducted by known methods wherein the anhydride is mixed with the glycol material and the reaction carried out at elevated temperatures whereby a random mixture of the diester isomers is obtained. The secondary and tertiary glycols are preferred over the primary glycols because the acid-esters prepared by reacting the secondary or tertiary glycols with the selected acid anhydride are more stable in the aqueous polyspirane dispersion enamel systems. Example 7 illustrates the preparation of a preferred diester from the reaction of pyromellitic dianhydride and butylene glycol.

EXAMPLE 7

50 grams of pyromellitic dianhydride are mixed with 100 grams of 2,3-butylene glycol and the esterification of the dianhydride takes place directly by merely heating the mixture to about 80° C. for approximately one to two hours and agitating the reaction mixture by mechanical means. The reaction product, a mixture of the two isomers of the dibutylene glycol ester of pyromellitic acid is soluble in the excess butylene glycol present. This entire mixture is water soluble and can be added directly to the polyspirane dispersion to make up the wire enamel.

A polyspirane dispersion is prepared according to the procedure described in Example 5 except that 1.8 grams of sodium lauryl sulfate is added to the reaction mixture before the initiation of polymerization and the reaction carried out at 70° C. for 24 hours. The properties of the resin contained in the dispersion so formed are a molecular weight of approximately 800, a corresponding Ostwald viscosity for a 7½% by weight cresylic acid solution of the resin of 43.9, and a melting range of 160–180° C.

To 1100 grams of this dispersion is added 76 grams of the curing agent solution prepared above along with 2.0 grams of zinc acetate and an additional 300 grams of water. Wire coated samples prepared according to the method described in Example 1 have the properties listed in Table 1.

The class of useful curing agents also includes certain acid-esters of polymeric polyacids. As typical of useful polymeric curing agents for the dispersion of the present invention are acid-esters of the copolymers of maleic acid and ethylene. The suitability of this type curing agent for the aqueous polyspirane dispersions of Example 1 as well as the preparation of the acid-ester is illustrated in the following example:

EXAMPLE 8

23.7 grams of the water soluble 1:1 molar ratio copolymer of maleic anhydride and ethylene is reacted with 78.9 grams of anhydrous ethanol by means of mixing the copolymer with ethanol and heating the mixture in the range 70–75° C. for ½ hour. The reaction product, comprising the acid-ester of the copolymer, remains in solution and the entire reaction mass is added to 800 grams of a dispersion prepared as taught in Example 1 and having a total solids of approximately 21.0%.

The coating composition thus formulated is dip applied to No. 18 magnet wire and the film heat cured, which results in a continuous film whose acceptability as a dielectric barrier can be illustrated by a dielectric breakdown value of 2055 volts/mil, a passable rating on the jerk test heretofore described and an average abrasion resistance of 29 strokes.

Certain chemical compounds are useful additives to the polyspirane cure reaction system as promoters of the cure reaction. For example, zinc acetate dihydrate and zinc borate, shown in the preceding examples, are illustrative of useful types of additives. These promoters increase the rate of cure and thereby reduce the time needed for the cure reaction as well as improve certain properties of the cured resinous product. The class of chemical compounds useful as promoters of the polyspirane cure reaction in addition to the organic curing agents are water soluble metal salts which can be further characterized as being sufficiently stable so that the metallic ion will not volatilize appreciably at the cure temperatures. The metallic portions of the salt can be selected from the group consisting of lead, lithium, cobalt, manganese, calcium, zinc, iron and cerium. The preferred concentration of the cure promoter in the coating compositions of the present invention is .10 to 1.0 percent by weight. The anionic portion of the salts is preferably selected from the group of weak acids, for example, acetic and boric acid.

Other polyspiranes are suitable for the practice of this invention than those specifically shown in the examples and whose formulations will be obvious to the man skilled in the art after the following discussion. The dialdehyde component of the resin can be selected from the group consisting of (a) succinaldehyde, glutaraldehyde, suberic dialdehyde, azeleic dialdehyde, sebacic dialdehyde, and mixtures thereof, (b) phthalic aldehydes and mixtures thereof and (c) mixtures of (a) and (b). The pentaerythritol component of the polyspirane condensation product can be selected from the group consisting of monopentaerythritol and mixtures of monopentaerythritol with dipentaerythritol containing up to 50% dipentaerythritol by weight of the mixture. The preferred concentration of polyspirane resin in the cured reaction products of this invention is about 85–99% by weight. The remaining portion of the cured reaction product comprises the residue from the acid-ester material. Where other additives are incorporated in the coating composition, the ratio of curing agent to polyspirane resin remains unaltered in the final solid resinous product.

Other liquids are suitable for the preparation of the polyspirane resin dispersion as diluents for the water used in the preceding examples as the monomer solvent. A limitation is necessarily imposed upon the suitability of the solvent in that it does not react with any of the other materials in the reaction mixture. It is also an obvious limitation on the solvent that it not boil off at the temperatures of the polymerization reaction although such problems can be minimized by conducting such reaction under pressurized conditions with possibly the use of an inert gas. As diluents for the water used as a solvent, there can also be used dioxane, dimethyl sulfoxide, certain alcohols, dimethyl formamide, and others.

The phenolic resins which are useful in the present invention can be limited to those which are water soluble or water dispersible and can be readily selected from the general class of phenolic aldehyde resins.

The phenolic portion of the resin, in addition to the phenol used in Example 6 may also be selected from the group consisting of xylenols, mixtures of phenol and cresol, mixtures of phenol, cresol and wood oil phenolic bodies, petro alkyl phenols, coal-tar phenol and others. The aldehyde portion of the resin, in addition to formaldehyde, may also be para-formaldehyde, acetaldehyde, furfural, or other suitable aldehydes. The preferred composition of phenolic-aldehyde resin useful in this invention is obtained by reacting one mol of the phenolic compound with an excess of the suitable aldehyde in the presence of an alkaline catalyst.

The curing temperatures required to obtain a smooth, continuous, hard film for the polyspirane systems of the present invention are generally limited to a temperature above the melting point of the particular polyspirane resin used. The actual cure temperature selected may be influenced in commercial practice by such other factors as the type curing equipment to be used and the desired time to complete the cure reaction. For the compositions in the preceding examples a standard commercial type wire enamel tower is utilized wherein operating temperatures of 300° C. to 400° C. are employed.

The exact curing temperatures of the above cured crosslinked films themselves were not determined during the wire tower runs. Even though the curing step was found to be a critical factor in producing films having the desired properties heretofore mentioned, measurement of these temperatures is extremely difficult to do in such an apparatus because of the continuous travel of the coated wire through the tower during the curing process. Curing temperatures were obtained, however, for coating compositions containing 100 parts of a polyspirane dispersion made according to the teachings of Example 1, .225 part of pyromellitic acid and 4.5 parts of furfuryl alcohol. Films of approximately .0005″ thickness were cast from the composition and cured in a circulating air oven at various times and temperatures. Films cured for 5 minutes at 200° C. had only fair resistance to the action of water and exhibited poor flexibility. Like films cured at 225° C. for 5 minutes resisted water attack and could furthermore be flexed around a ⅛″ diameter mandrel without crazing. Other films of the same resin composition but containing 2½ parts pyromellitic acid when cured at 375° C. for 2 minutes gave excellent results for the same tests. These samples had good water resistance. It is obvious from the above discussion that both the proper cure temperatures and the time of cure can be determined experimentally for the particular polyspirane systems employed. Although the cure data shown is for pyromellitic acid as the curing agent, it is believed that these same conditions would be appropriate for the acid-ester curing agents of the present invention.

It is to be understood that this invention is not limited to the particular wire coating or wire size described above. It is obvious from the above test results that a wire coated with the cured polyspirane systems shown will be acceptable for high temperature service. But it is also obvious to the man skilled in the art to modify the application of the coating compositions so as to upgrade its high temperature usefulness by means of known practices in the field. It is possible for instance to utilize the present coatings as an undercoat on a wire and to apply as an overcoat one or more of the many compatible insulating varnishes and thereby obtain a coating acceptable at even higher operating temperatures. It is also not intended to limit the application of the coating compositions of the present invention as an electrical insulation for wire merely. It is possible by means of dipping, casting, and other known means to form insulation from the compositions that is useful in such electrical applications as slot liners, encapsulation, sheet insulation, and surface coatings. The coating compositions can also be used as an adhesive agent in the bonding of electrical parts that are used at elevated temperatures. Further use can be made of the invention as insulation and/or impregnating varnishes for such articles as glass tapes and electrical coils.

In addition to the various applications for which this resin is particularly suitable as hereinbefore described, it will be obvious to the man skilled in the art that not only other applications are apparent but that other compositions and other processes for the manufacture of those compositions are likewise within the scope of this invention.

What is claimed is:

1. A coating composition comprising an aqueous dispersion of (A) a polyspirane resin comprising the condensation product of (1) a material taken from the group consisting of, phthalic aldehydes succinaldehyde, glutaraldehyde, suberic dialdehyde, azeleic dialdehyde, sebacic dialdehyde phthalic aldehydes and mixtures thereof, with (2) a material taken from the group consisting of monopentaerythritol and mixtures of monopentaerythritol with dipentaerythritol containing up to 50% dipentaerythritol by weight of the mixture and (B) an acid-ester selected from the group consisting of water-soluble acid-esters and acid-esters soluble in a mixture of water and an organic water miscible solvent, wherein the acid-ester is the half ester reaction product of an alcohol with a polycarboxylic acid anhydride material selected from the group consisting of anhydride and dianhydrides.

2. A coating composition as in claim 1 also containing 0.1 to 1.0% by weight of the coating composition of a cure promotor selected from the group consisting of water-soluble salts of lead, lithium, cobalt, manganese, calcium, zinc, iron and cerium.

3. A coating composition as in claim 1 also containing a phenolic aldehyde resin.

4. A process for the manufacture of a coating composition comprising (A) the mixing in water of (1) a material taken from the group consisting of, phthalic aldehydes succinaldehyde, glutaraldehyde, suberic dialdehyde, azelaic dialdehyde, sebacic dialdehyde phthalic aldehydes and mixtures thereof, with (2) a material taken from the group consisting of monopentaerythritol and mixtures of monopentaerythritol with dipentaerythritol containing up to 50% dipentaerythritol by weight of the mixture (B) subjecting the aqueous mixture of (A) to polymerization under acidic conditions, agitation and elevated temperature so as to form discrete, insoluble resin particles in said mixture, and thereafter (C) adding to the mixture of (B) a solution of an acid-ester selected from the group consisting of water-soluble acid-esters and acid-esters soluble in a mixture of water and an organic water miscible solvent, wherein the acid-ester is the half ester reaction product of an alcohol with a polycarboxylic acid anhydride material selected from the group consisting of anhydrides and dianhydrides.

5. A process for the manufacture of a solid resinous product comprising the heat curing at temperatures above 225° C. of a coating composition comprising an aqueous dispersion of (A) a polyspirane resin comprising the condensation product of (1) a material taken from the group consisting of, phthalic aldehydes succinaldehyde, glutaraldehyde, suberic dialdehyde, azelaic dialdehyde, sebacic dialdehyde phthalic aldehydes and mixtures thereof, with (2) a material taken from the group consisting of monopentaerythritol and mixtures of monopentaerythritol with dipentaerythritol containing up to 50% dipentaerythritol by weight of the mixture and (B) an acid-ester selected from the group consisting of water-soluble acid-esters and acid-esters soluble in a mixture of water and an organic water miscible solvent, wherein the acid-ester is the half ester reaction product of an alcohol with a polycarboxylic acid anhydride material selected from the group consisting of anhydrides and dianhydrides.

References Cited in the file of this patent

UNITED STATES PATENTS

| | | |
|---|---|---|
| 2,389,662 | Fisher et al. | Nov. 27, 1945 |
| 2,643,236 | Kropa et al. | June 23, 1953 |
| 2,785,996 | Kress | Mar. 19, 1957 |
| 3,015,643 | Markhart et al. | Jan. 2, 1962 |

OTHER REFERENCES

Lange: "Handbook of Chemistry," 8th edition, Handbook Publishers Inc., Sandusky, Ohio, 1952, page 574.

Bjorksten: "Polyesters and Their Applications," Reinhold Publishing Company, New York, page 167, paragraph 5, page 168, paragraph 1.